United States Patent
Chaiken et al.

(10) Patent No.: US 10,133,800 B2
(45) Date of Patent: Nov. 20, 2018

(54) PROCESSING DATASETS WITH A DBMS ENGINE

(71) Applicant: Microsoft Corporation, Redmond, WA (US)

(72) Inventors: Ronnie Chaiken, Woodinville, WA (US); Oliver Foehr, Bellevue, WA (US); Per-Ake Larson, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 151 days.

(21) Appl. No.: 14/024,255

(22) Filed: Sep. 11, 2013

(65) Prior Publication Data
US 2015/0074151 A1    Mar. 12, 2015

(51) Int. Cl.
*G06F 17/00* (2006.01)
*G06F 17/30* (2006.01)

(52) U.S. Cl.
CPC .. *G06F 17/30569* (2013.01); *G06F 17/30315* (2013.01); *G06F 17/30318* (2013.01); *G06F 17/30501* (2013.01); *G06F 17/30575* (2013.01)

(58) Field of Classification Search
CPC ........ G06F 17/30091; G06F 17/30864; G06F 17/30598; G06F 17/30442; G06F 17/30867; G06F 3/0607; G06F 9/5005; G06Q 10/06; Y02B 60/33
See application file for complete search history.

(56) References Cited

U.S. PATENT DOCUMENTS

| | | | | |
|---|---|---|---|---|
| 8,892,599 B2* | 11/2014 | Lindblad et al. | | 707/770 |
| 2005/0055351 A1* | 3/2005 | Barton | | G06F 17/30345 |
| 2006/0053183 A1* | 3/2006 | Eaton | | G06F 11/1482 |
| 2007/0061544 A1* | 3/2007 | Uppala | | G06F 17/30315 |
| | | | | 711/173 |
| 2008/0294863 A1* | 11/2008 | Faerber | | H03M 7/3084 |
| | | | | 711/170 |
| 2010/0257198 A1* | 10/2010 | Cohen | | G06F 17/30557 |
| | | | | 707/770 |
| 2011/0029569 A1* | 2/2011 | Ganesh | | G06F 17/30595 |
| | | | | 707/796 |

(Continued)

OTHER PUBLICATIONS

Abouzeid, et al., "HadoopDB: An Architectural Hybrid of MapReduce and DBMS Technologies for Analytical Workloads", in Journal of Very Large Database Endowment, ACM, Aug. 24, 2009, 12 pages, vol. 2, Issue 1, Lyon, France.

(Continued)

*Primary Examiner* — Augustine K. Obisesan
(74) *Attorney, Agent, or Firm* — International IP Law Group, P.L.L.C.

(57) ABSTRACT

A system and method to process a dataset with a database management system (DBMS) engine. The method includes splitting bulk data into a plurality of chunks. The method also includes converting the chunks to a plurality of row groups. The row groups are a dataset external to a DBMS comprising the DBMS engine. The method further includes creating an empty DBMS table within the DBMS. Additionally, the method includes attaching the dataset external to the DBMS to the empty DBMS table. The method also includes executing a MapReduce job on a cluster of compute nodes, using the dataset external to the DBMS as input.

20 Claims, 8 Drawing Sheets

(56) References Cited

U.S. PATENT DOCUMENTS

| | | | |
|---|---|---|---|
| 2011/0047172 A1* | 2/2011 | Chen | G06F 17/30445 707/764 |
| 2011/0191361 A1* | 8/2011 | Gupta et al. | 707/763 |
| 2012/0016901 A1* | 1/2012 | Agarwal et al. | 707/769 |
| 2012/0254193 A1 | 10/2012 | Chattopadhyay et al. | |
| 2012/0310916 A1* | 12/2012 | Abadi | G06F 17/30445 707/713 |
| 2013/0024412 A1 | 1/2013 | Gong et al. | |
| 2013/0060780 A1* | 3/2013 | Lahiri | H03M 7/3088 707/741 |
| 2013/0124483 A1 | 5/2013 | Furushashi et al. | |
| 2013/0282650 A1* | 10/2013 | Zhang | G06F 17/30592 707/605 |

OTHER PUBLICATIONS

Abouzied, et al., "HadoopDB in Action: Building Real World Applications", in the ACM SIGMOD International Conference on Management of Data, Jun. 6, 2010, 3 pages, Indianapolis, Indiana, USA.
Alagiannis, et al., "NoDB in Action: Adaptive Query Processing on Raw Data", in Journal of Very Large Database Endowment, Aug. 27, 2012, pp. 1942-1945, vol. 5, Issue 12, Istanbul, Turkey.
Boncz, et al., "MonetDB/X100: Hyper-Pipelining Query Execution", in Second Biennial Conference on Innovative Data Systems Research, Jan. 4, 2005, 13 pages.
Chaiken, et al., "SCOPE: Easy and Efficient Parallel Processing of Massive Data Sets", in Journal of the VLDB Endowment, vol. 1, Issue 2, Aug. 24, 2008, pp. 1-12, Auckland, New Zealand.
Dean, et al., "MapReduce: Simplified Data Processing on Large Clusters", in Magazine of Communications of the ACM, vol. 51, Issue 1, Jan. 2008, pp. 107-113.
Dewitt, D J., "Polybase: What, Why, How", Retrieved on: Jun. 11, 2013, Available at: http://gsl.azurewebsites.net/Portals/0/Users/dewitt/talks/PolybasePass2012.pptx, Microsoft Jim Gray Systems Lab, pp. 1-60, Madison, Wisconsin, USA.
Friedman, et al., "SQL/MapReduce: A Practical Approach to Self-describing, Polymorphic, and Parallelizable User-defined Functions", in Proceedings of the Very Large Data Base Endowment, vol. 2, Issue 2, Aug. 24, 2009, 12 pages, Lyon, France.
Floratou, et al., "Column-Oriented Storage Techniques for MapReduce", in Proceedings of the Very Large Database Endowment, vol. 4, Issue 7, Aug. 29, 2011, pp. 419-429, Seattle, WA, USA.
Ghemawat, et al., "The Google File System", in Proceedings of the Nineteenth ACM Symposium on Operating Systems Principles, Oct. 19, 2003, 15 pages, Bolton Landings, NY, USA.
EMC Corporation, "Greenplum Database 4.1 Administrator Guide", in Book of Greenplum: The Data Computing Division of EMC, May 2011, 1028 pages.
Guinebertiere, et al., "Leveraging a Hadoop Cluster from SQL Server Integration Services (SSIS)", Published on: Oct. 2012, revised Apr. 2013, Microsoft Corporation, Available at: http://download.microsoft.com/download/D/2/0/ D20E1C5F-72EA-4505-9F26-FEF9550EFD44/Leveraging%20a%20Hadoop%20cluster%20from%20SQL%20Server%20Integration%20Services.docx, 69 pages.
Greenplum, "HAWQ: A True SQL Engine for Hadoop", in White Paper EMC, Retrieved on: Jun. 13, 2013, 5 pages.
He, et al., "RCFile: A Fast and Space-efficient Data Placement Structure in MapReduce-based Warehouse Systems", in IEEE 27th International Conference on Data Engineering, Apr. 11, 2011, pp. 1199-1208.
Kestelyn, Justin, "Introducing Parquet: Efficient Columnar Storage for Apache Hadoop", Published on: Mar. 13, 2013, pp. 1-5, Available at: http://blog.cloudera.com/blog/2013/03/introducing-parquet-columnar-storage-for-apache-hadoop/.
Larson, et al., "Enhancements to SQL Server Column Stores", in Proceedings of ACM SIGMOD, Jun. 22, 2013, 10 pages, New York, NY, USA.
Larson, et al., "SQL Server Column Store Indexes", in Proceedings of the ACM SIGMOD International Conference on Management of Data, Jun. 12, 2011, pp. 1177-1184, Athens, Greece.
O'Malley, Owen, "Create a New Optimized Row Columnar File Format for Hive", The Apache Software Foundation, Publishd on: Jan. 9, 2013, pp. 1-17, Available at: https://issues.apache.org/jira/browse/HIVE-3874.
Pavlo, et al., "A Comparison of Approaches to Large-Scale Data Analysis", in Proceedings of the ACM SIGMOD International Conference on Management of Data, Jun. 29, 2009, 14 pages, Providence, Rhode Island.
Stonebraker, et al., "MapReduce and Parallel DBMSs: Friends or Foes?", in Communications of the ACM—Amir Pnueli: Ahead of His Time, vol. 53, Issue 1, Jan. 2010, pp. 64-71.
Teradata Corporation, "MapReduce, SQL-MapReduce® Resources & Learning", Published on: Jan. 8, 2010, pp. 1-2, Available at: http://www.asterdata.com/resources/mapreduce.php.
Thusoo, et al., "Hive—A Warehousing Solution over a Map-Reduce Framework", in Journal of the VLDB Endowment, vol. 2, Issue 2, Aug. 24, 2009, 4 pages, Lyon, France.
The Apache Software Foundation, "Trevni: A Column File Format", Retrieved on: Jun. 13, 2013, pp. 1-6, Available at: http://avro.apache.org/docs/current/trevni/spec.html.
"Openrowset (Transact-SQL)", Published on: Aug. 18, 2013 Available at: http://wayback.archive.org/web/20130818194008/http://msdn.microsoft.com/en-us/library/ms190312.aspx.
"SQL Server 2008 R2—Filestream Overview", Published on: Jan. 10, 2013 Available at: http://wayback.archive.org/web/20130110230009/http://technet.microsoft.com/en-us/library/bb933993(v=sql.105).aspx.
Bajda-Pawlikowski, et al., "Efficient Processing of Data Warehousing Queries in a Split Execution Environment", in Proceedings of the ACM SIGMOD International Conference on Management of Data, Jun. 12, 2011, pp. 1165-1176.
Yang, et al., "Osprey: Implementing MapReduce-Style Fault Tolerance in a Shared-Nothing Distributed Database", in Proceeedings of 29th International Conference on Data Engineering (ICDE), Mar. 1, 2010, pp. 657-668.
"International Search Report and Written Opinions Issued in PCT Application No. PCT/US2014/054449", dated Jan. 29, 2015, 11 Pages.
"Second Written Opinion Issued in PCT Application No. PCT/US2014/054449", dated Aug. 11, 2015, 7 Pages.
Elmasri, Ramez, et al., "Chapter 17: Disk Storage, Basic File Structures, and Hashing"; Fundamentals of Database Systems (Sixth Edition), Addison-Wesley, Jan. 1, 2011, pp. 583-630, XP009171421, ISBN; 978-0-13-608620-8.
"International Preliminary Report on Patentability Issued in PCT Application No. PCT/US2014/054449", dated Dec. 14, 2015, 9 Pages.

* cited by examiner

700

PROCESSING DATASETS WITH A DBMS ENGINE

BACKGROUND

Big data is a reference to datasets so large that it is challenging to process the datasets with typical database management system (DBMS) tools, and data processing applications. MapReduce systems and massively parallel processing (MPP) systems are two approaches to deal with big data, processing large datasets.

MapReduce is a programming model for processing large datasets with a parallel, distributed processing on a cluster of compute nodes. The MapReduce infrastructure manages the distributed servers of the cluster to run various tasks in parallel; manages communications and data transfers; provides for redundancy and fault tolerance; and, so on. MapReduce-like computations share many computational characteristics of a MPP database, but MPP databases can outperform a similar MapReduce job by more than an order of magnitude. Unfortunately, MPP databases may not scale well, may not be fault-tolerant, and also may not have other MapReduce-like properties.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The claimed subject matter includes a system and method to process a dataset with a database management system (DBMS) engine. The method includes splitting bulk data into a plurality of chunks. The method also includes converting the chunks to a plurality of row groups. The method further stores the data in each row group in a columnar organization, whereas values in the same column of all rows in the row group are stored consecutively, and separate from data of the other columns, while preserving the ordinal order of the row to which the data belongs; this allows reconstitution of the original row data. The row groups are a dataset external to a DBMS comprising the DBMS engine. The method further includes creating an empty DBMS table within the DBMS. Additionally, the method includes attaching the dataset external to the DBMS to the empty DBMS table. The method also includes executing a MapReduce job on a cluster of compute nodes, using the dataset external to the DBMS as input to the MapReduce system. The system includes a cluster of compute nodes. Each of the compute nodes includes a processing unit, and a system memory. The system memory includes code configured to perform techniques described herein.

The external columnar format (ECF) is similar to a columnar format the DBMS uses to store data internally. In other words, the DBMS stores its own, internal data in a similar columnar format. Bulk data may arrive in the external columnar format, or be converted to the ECF from other formats, including row-like formats.

Converting bulk data to the ECF includes converting the chunks into row groups. Row groups may be associated with the DBMS such that the DBMS performs SQL-like operations on the data stored in the ECF. The external data may be imported, or processed in the ways a typical DBMS processes data stored internally in databases, tables, views, or any of the numerous data structures of a DBMS. Additionally, instead of performing a relatively slow, contentious IMPORT in the DBMS, bulk data in the ECF may be copied into a database table as a binary object, without contention. The MapReduce architecture includes a computing cluster to scale out the conversion of bulk data to the ECF in parallel. The MapReduce architecture may also be integrated with the DBMS to perform MapReduce-like processing on bulk data in the ECF. Map-like operations partition the bulk data for processing on separate nodes. Reduce-like operations perform the DBMS processing on the converted ECF data.

The following description and the annexed drawings set forth in detail certain illustrative aspects of the claimed subject matter. These aspects are indicative, however, of a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 1:
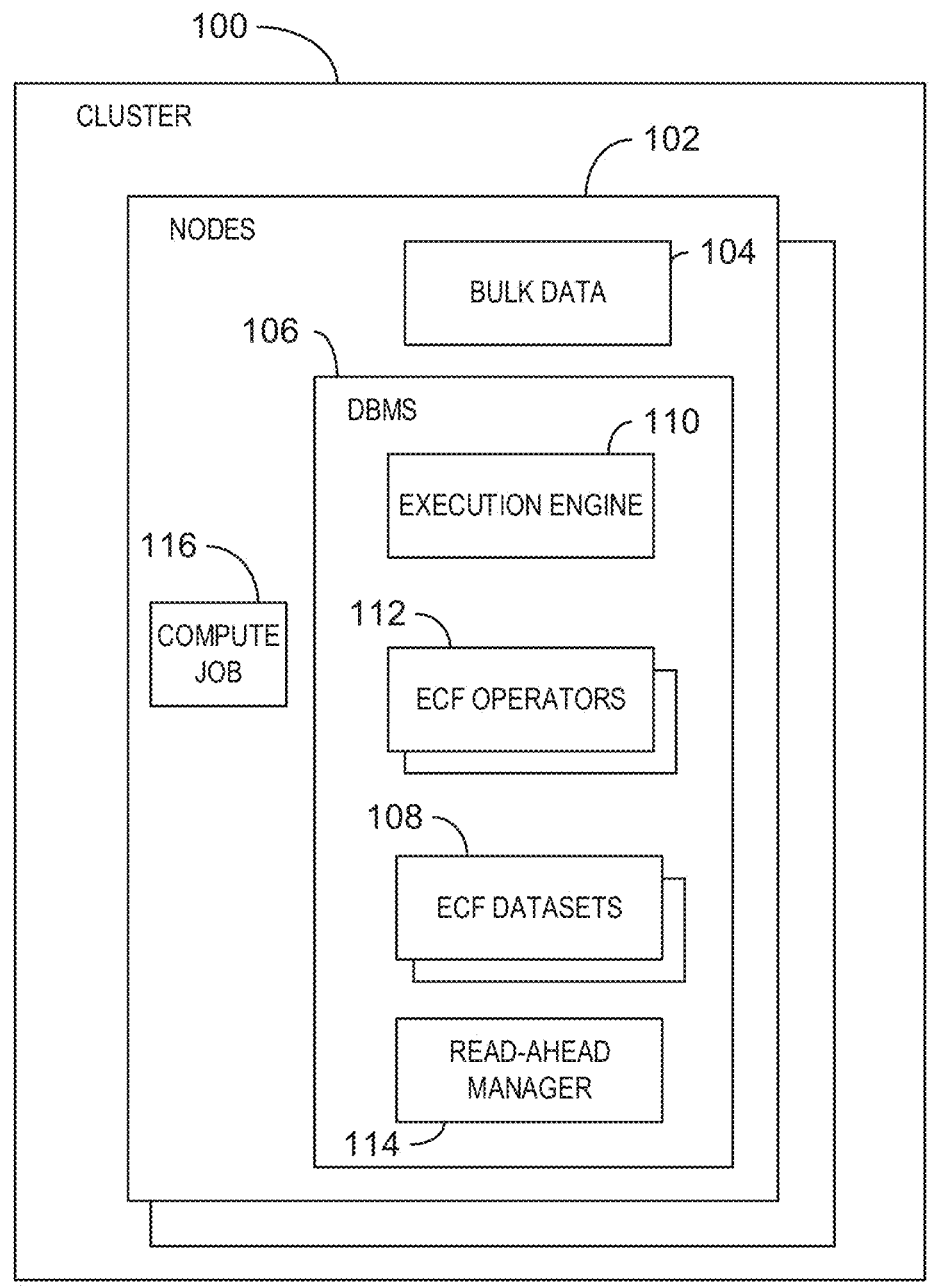
FIG. 1 is a block diagram of a system for processing datasets with a database management system (DBMS) execution engine, in accordance with the claimed subject matter.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, the terms "component," "system," "client" and the like are intended to refer to a computer-related entity, either hardware, software (e.g., in execution), firmware, or a combination thereof. For example, a component can be a process running on a processor, an object, an executable, a program, a function, a library, a subroutine, a computer, or a combination of software and hardware.

By way of illustration, both an application running on a server and the server can be a component. One or more components can reside within a process and a component can be localized on one computer and/or distributed between two or more computers. The term, processor, is generally understood to refer to a hardware component, such as a processing unit of a computer system.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, or media.

Computer-readable storage media can include but are not limited to magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). In contrast, computer-readable media generally (i.e., not storage media) may additionally include communication media such as transmission media for wireless signals and the like.

Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Examples of the claimed subject matter process datasets with a database management system (DBMS) execution engine. Processing datasets in this way speeds up data loading, provides the ability to query bulk data without importing the data into the DBMS, and can be used in data warehouse applications by integrating the DBMS with a MapReduce system.

FIG. 1 is a block diagram of a compute cluster 100, in accordance with the claimed subject matter. The cluster 100 may represent a MapReduce cluster, or a cluster of staging servers, and includes numerous compute nodes 102. Each of the nodes 102 includes bulk data 104, an instance of a DBMS 106, external columnar format (ECF) datasets 108, and a compute job 116. The bulk data 104 includes one or more datasets containing data to be loaded, queried, or used to build a data warehouse. The bulk data 104 may be represented in the ECF, or another columnar- or row-like format. Comma separated values (CSV) is an example of a row format. The format of the bulk data 104 is provided by a producer of the data. For example, an SQL server may produce bulk data 104 in Hadoop File System (HDFS) format.

The DBMS 106 is software that facilitates the defining, creating, querying, updating, and administering of the DBMS' databases (not shown). In an embodiment of the claimed subject matter, the DBMS 106 operates in a vectored query execution, i.e., batch mode, where batches of data from multiple tuples (stored column-wise) are processed as a group. A tuple is an ordered list of elements, such as a row in a typical relational database table. The vectored query execution mode is an alternative to a row sequential mode, where queries are processed by the tuple.

Column store indexes for the DBMS 106 are stored inside the database. The data is stored in chunks of approximately one million rows, called row groups. Each column of a row group, called a column segment, is stored in a binary large object (Blob). Additionally, for each column in a row group, there may be a primary dictionary and a secondary dictionary for repeatedly occurring values, also stored as Blobs. Metadata is also maintained for each column segment, such as the name, type, minimum and maximum values, and so on.

ECF row groups are written to ECF datasets 108 that are stored outside the DBMS 106. The ECF is similar to an internal columnar representation of data stored in the DBMS 106. Storing the ECF datasets 108 in columnar format, which is more compact than typical row-based formats, saves storage space. External tables that are not in the ECF typically take longer to process than internal tables. This may be because part of the processing includes parsing external data, and converting to the internal format. In contrast, internal tables are not converted. Further, in some approaches, scans over external tables may not be parallelized, but performed sequentially by a single thread.

The DBMS 106 includes an execution engine 110, ECF operators 112, and a read-ahead manager 114. The execution engine 110 is a component of the DBMS 106 that creates, reads, updates, and deletes: databases, tables, or other structures and data. The execution engine 110 invokes the ECF operators 112 as specified by the compute job 116.

The compute job 116 may be a computer program coded in a query language, similar to the structured query language (SQL), compiled to use ECF operations 112 that enable access to the ECF datasets 108. The ECF operators 112 include operators that allow data in ECF format to be exported from, imported to, queried, or otherwise-processed, by the DBMS 106. The ECF operators 112 also include operations for querying attached external ECF datasets 108 without importing the data into the DBMS 106.

The read-ahead manager 114 masks the latency of reading the attached external ECF datasets 108 from a file system. The read-ahead manager 114 may support reading the ECF datasets 108 from local new technology file systems (NTFS), server message block (SMB) shares, and specific MapReduce file systems, such as the HDFS, for example. In this way, the read-ahead manager 114 transparently supports ECF datasets 108 stored on various, heterogeneous file systems.

Examples of the cluster 100 may provide a rapid transfer of data from operational and staging compute nodes 102 into a data warehouse. Additionally, the ECF operators 112 provide the ability to inter-operate with specific MapReduce systems, such as, Hadoop. In an embodiment of the claimed subject matter, the same data may be accessed by both a DBMS 106 and by Hadoop jobs. Further, the ability to access external data directly from the ECF datasets 108 provides the performance benefit of vectored query execution.

In the cluster 100, multiple DBMSs 106, e.g., multiple DBMS engines, each running on separate nodes, may share a single read-only copy of data. The cluster 100 may also provide support for single-table backup and restore, for static data. Additionally, the cluster 100 may provide support for fast, compressed archival of old data in a format that remains efficiently query-able. (These capabilities are enabled by the ECF format).

Generally, converting bulk data to ECF, and loading the ECF data into the DBMS 106 may be CPU-intensive. For example, it can take an anywhere from 10 seconds to several minutes for one thread to convert a million rows to ECF, depending on characteristics of the data. Long load times can be a problem in data warehouse (DW) environments, making it a challenge for the DW operations team to finish a load within a limited batch window. Long load times also delay the availability of data used to generate reports. As such, the information in the reports may be stale by the time the report is generated. Long load times on a single compute node may result from the sequential nature of parsing rows of input data, which leads to logging problems and lock contention. Lock contention is when multiple threads compete for the same lock. Locks are mechanisms for ensuring sequential access order. Lock contentions may repeatedly result from inserting a large number of rows into a heap holding a database table, or from index construction. The lock enforces a mutual exclusion concurrency control policy to ensure the threads are provided access in order.

However, ECF row groups make it possible to parallelize the conversion of the bulk data 104 to the ECF datasets 108, and binary copy the ECF datasets 108 into the DBMS 106. In this way, the system provides a method for data loading faster than typical methods.

Figure 2:
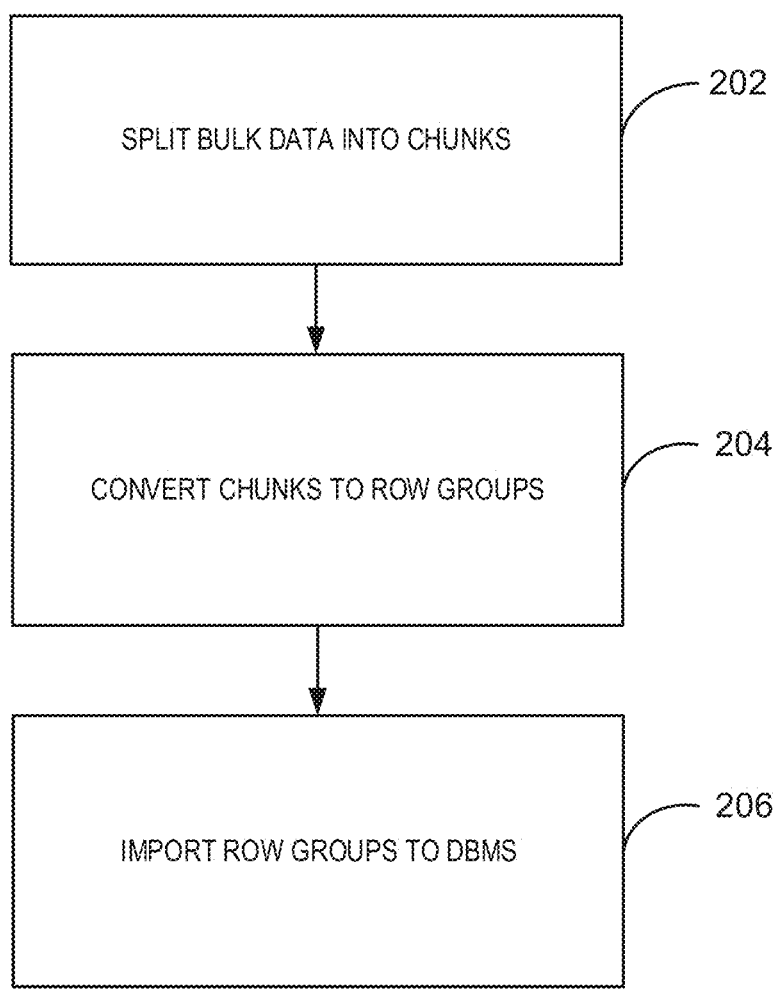
FIG. 2 is a process flow diagram of a method for data loading, in accordance with the claimed subject matter.

FIG. 2 is a process flow diagram of a method 200 for data loading in the system 100, in accordance with the claimed subject matter. The method 200 may be performed by the compute job 116, and begins at block 202, where the bulk data 104 is split into chunks with an approximately equal number of rows. In an embodiment, the compute job 116 may be a parallel data transform job.

At block 204, each chunk is converted by a column index builder (a DBMS instance) into one or more row groups. Various index builders may run in parallel on the cluster 100, and write the generated ECF row group data to a distributed set of ECF datasets 108. Because index builders operate independently from each other, cluster throughput scales linearly with the number of compute nodes 102.

At block 206, the distributed ECF datasets 108 are imported into a specific DBMS 106. However, the DBMS import operation is expensive in terms of I/O. Alternatively, the ECF datasets 108 may be copied onto local files on a selected compute node 102. It is noted that there is no copying from HDFS or Azure files to local files. A lightweight metadata operation ('attach') makes the local ECF datasets 108 available without costly import operations, enabling the local DBMS 106 to query the external ECF datasets 108 as if they were stored in internal tables.

Copying datasets is faster than importing data into the DBMS 106 because file copy throughput is merely gated by bandwidth, of the network, and of the compute node's local storage subsystem. However, when importing data into the DBMS 106, throughput may be limited by lock contentions and index builders.

Instead of copying the ECF datasets 108 to local storage for querying, it is possible to import ECF datasets 108 directly into the DBMS 106, where it is stored using an internal binary type, such as Blob. The segments and dictionaries of the ECF datasets 108 are written to BLOBs, and a DBMS log. However, once imported in this manner, the ECF data becomes a normal part of the database, which can be queried, updated, backed up, replicated, and so on.

In an embodiment of the claimed subject matter, experiments were run on data in CSV format with 60 million, 600 million, and 6 billion tuples of data. As a baseline, the experiment used a workflow that includes loading bulk data into a single instance of the DBMS 106; and, column store index generation.

The workflow converted raw bulk data 104 to ECF row group data, e.g., ECF datasets 108, on a multi-node cluster, followed by an import or copy to local storage, and an attach of the row groups. Using an ATTACH is more efficient than an SQL IMPORT. Once the data was imported, or attached, Query 1 was run from the TPC-H workload. The TPC-H workload is for decision support, and includes business-oriented ad-hoc queries, and concurrent data modifications. The TPC-H database is configured to be broad, and relevant across industries. The elapsed time was measured from the beginning of the workflow until the query finished. In the experiment, the target DBMS' compute node used 3 physical disks to store the database files, and 8 CPU cores running at 2.4 GHz. The cluster 100 used for the index build consisted of 8 machines.

Figure 3:
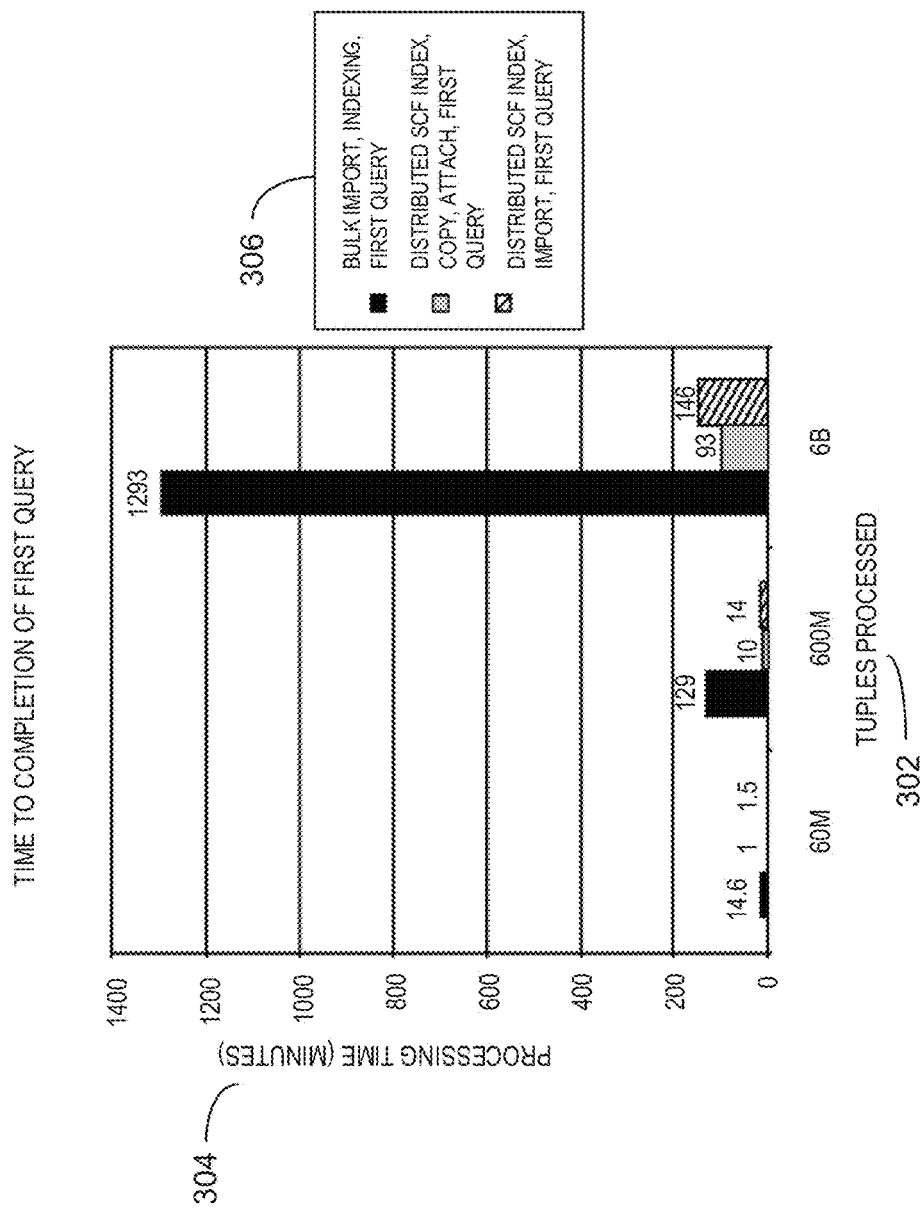
FIG. 3 is a graph showing an experimental result of the system for processing datasets with a DBMS engine, in accordance with the claimed subject matter.

FIG. 3 is a graph 300 of an experimental result, in accordance with the claimed subject matter. The graph 300 includes an X-axis 302 representing the number of tuples processed, Y-axis 304 representing the processing time, in minutes. The legend 306 identifies three different test scenarios. The experimental data shows that for TPC-H LINEITEM data at scale factor 1000, the traditional workflow loads bulk data at a rate of approximately 1.45 GB/minute. Loading a 763 GB TPC-H LINEITEM table took roughly 8.7 hours. Subsequent column store index generation on the loaded data took roughly 12.75 hours resulting in total end-to-end time of 21.55 hours (1,293 min). The traditional workflow offers no scalability because index building is CPU bound, and inserting rows causes lock contention.

For the ECF workflows, the index generation throughput was 1.3 GB/minute/node. On an 8 node cluster, the aggregate index generation throughput was 10 GB/minute, thus producing the converted ECF data in 1.22 hours. Copying the resulting index data of 255.7 GB to local storage at a rate of 12.8 GB/minute took 0.33 hours. The attachment of the ECF row groups proceeded at more than 100 row groups/second. With this workflow the end-to-end time of 1.55 hours (93 min) represents a speedup of 13.9× compared with the traditional workflow.

Importing the ECF data into the DBMS 106 proceeded at a rate of 5.4 GB/minute, finishing in 1.1 hours of processing time. The end-to-end time was 2.37 hours (142 min) which represents a speedup of 8.9× compared with the traditional workflow. The speedups are similar for 600 million tuples, and 6 billion tuples. The ECF workflows are more scalable because index generation can be arbitrarily scaled by adding additional nodes to the index generation cluster.

Typical database systems provide some way to access external data, in other words, data not managed by the DBMS 106. In SQL Server this ability is provided by the OPENROWSET facility. Systems differ in what features, formats, and data sources they support but, they typically support reading rows in textual format from external files, i.e., ECF datasets 108. One property of external files is that the data flows directly into query operators without being stored by the DBMS 106. An additional benefit is that an external file can be shared by different instances of the DBMS 106. However, the current support for external tables is inefficient when processing large amounts of data, such as Big Data.

In contrast, external tables stored in ECF format, i.e., ECF datasets 108 can be processed efficiently because the row groups of the ECF datasets 108 have the same format as the internal column store index, and can be processed in the same way. Further, different ECF row groups can be processed in parallel. Efficient parallel execution typically uses aggressive read-ahead of row groups, which is provided by the read-ahead manager 114. For example, optimizations over whole row groups is more efficient than those over single tuples.

To be able to query the ECF datasets 108, an empty table is created in the DBMS 106 that includes the columns being queried. Each row group of the ECF datasets 108 is attached to the empty table by using an ECF operator 112. The attach is a non-complex metadata operation. Thus, the ECF datasets 108 are available for querying immediately after the attach operation completes. Attaching a row group involves reading the metadata for the row group, and updating a DBMS catalog. The actual data is not loaded into DBMS 106.

The read-ahead manager 114 makes it possible to retrieve the metadata for a large number of row groups in parallel. The catalog operations performed by the DBMS 106 to keep track of these references are light-weight and fast. In one example, speeds of more than 100 row groups per second were attached, which is equivalent to 100 million to 400 million tuples per second (depending on number of rows per row group). Once the row groups are attached, the external ECF datasets 108 can be used in queries in the same way as any other table, view, and the like. The read-ahead manager 114 retrieves dictionary and segment data from the ECF datasets 108 efficiently, and in parallel. The ECF datasets 108 are cached in the execution engine's large-object cache in the same way as internal dictionaries and column segments.

An example experiment was designed to answer two questions: 1) how fast is processing of an external table in ECF compared with an internal DBMS column store index? 2) Does the processing speed depend on which file system the external table is stored?

In the experiment, all external ECF datasets 108 were retrieved through the read-ahead manager 114. The internal column store index was stored in the DBMS's internal format, with the test database stored on 3 independent physical disk drives. The benchmark TPC-H Query 1 was used to provide the test sample. Each row group was stored in a single dataset.

Experimental times were measured as 'cold start' with all internal caches of the DBMS 106 flushed prior to each query. A single 'warm start' time is also reported for reference purposes. The data was the familiar TPC-H LINEITEM table with 60 million, 600 million, and 6 billion tuples of bulk data.

Table 1 shows the elapsed time for the attach operator. The elapsed time includes the time for creating an empty table, and attaching the row groups of the external ECF datasets 108. The number of row groups was 15, 151, and 1500, respectively, for the different scale factors. Attaching 1,500 row groups took between 10 and 14 seconds depending on the file system, giving an attach rate of 100-150 row groups per second.

TABLE 1

Time (in seconds) to attach ECF row groups stored on different file systems.

| File system | Data sources | 60 million | 600 million | 6 billion |
|---|---|---|---|---|
| HDFS | 8 data nodes, 2 disks/node | 1 | 2 | 14 |

TABLE 1-continued

Time (in seconds) to attach ECF row groups stored on different file systems.

| File system | Data sources | 60 million | 600 million | 6 billion |
|---|---|---|---|---|
| HDFS | 15 data nodes, 2 disks/node | 1 | 2 | 14 |
| SMB shares | 16 shares on 8 nodes | 1 | 1 | 10 |
| NTFS local | 3 disks | 1 | 1 | 13 |

Table 2 shows the elapsed time to run TPC-H Query 1 for six different scenarios.

TABLE 2

Time (in seconds) to run a query with row groups stored on different file systems.

| File system | Data sources | 60 million | 600 million | 6 billion |
|---|---|---|---|---|
| HDFS | 8 data nodes, 2 disks/node | 5 | 37 | 330 |
| HDFS | 15 data nodes, 2 disks/node | 5 | 32 | 324 |
| SMB shares | 16 shares on 8 nodes | 4 | 29 | 289 |
| NTFS local | 3 disks | 3 | 28 | 266 |
| Internal CSI | 3 disks | 4 | 32 | 284 |
| Warm (cached) | | 3 | 22 | 219 |

Overall, the differences in processing time are fairly small, ranging from 6% faster to 16% slower than for an internal column store index. The ECF has the potential to provide an efficient external table facility for the DBMS. Storing data in columnar format reduces storage requirements because the data can be compressed more efficiently. It also reduces the amount of I/O during processing because only the columns specified by the query are read.

In an embodiment of the claimed subject matter, the DBMS 106 is integrated with a MapReduce system to improve performance of MapReduce jobs. Database systems and MapReduce systems are typically designed to process data in row format, not columnar format. One way to integrate columnar storage with row-wise processing is to read the data in columnar format, and replace the columnar format with equivalent rows. However, by using columnar data, performance can be improved by using vectorized (column-wise) query processing.

Figure 4:
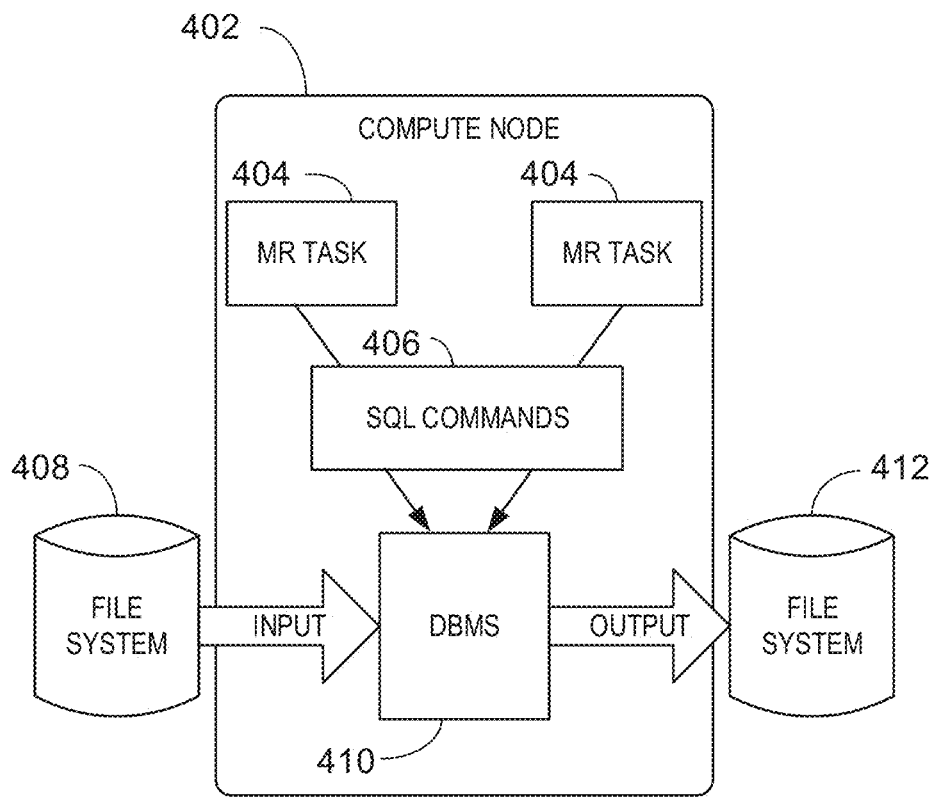
FIG. 4 is a block diagram of a MapReduce SQL system, in accordance with the claimed subject matter.

FIG. 4 is a block diagram of a MapReduce SQL system 400, in accordance with the claimed subject matter. The system 400 integrates the DBMS 106 into MapReduce workflows, taking advantage of features of both systems. MapReduce systems, like Hadoop, provide job tracking and scheduling, data shuffling, fault tolerance, and a distributed file system. The system 400 also leverages the DBMS's query processor to process data efficiently.

In the system 400, an instance of a DBMS 410 is deployed on each compute node 402 of a Hadoop cluster. Map and reduce tasks 404 running on the node 402 use the DBMS' query processor for processing data in ECF, or other formats, such as, CSV.

The DBMS 410 reads data from external files 408 and outputs the results to files 412 for a specific file system.

Having input data in ECF enables faster processing, but other formats such as CSV may also be supported. The MR tasks 404 instruct the DBMS 410 what to do by opening a connection and submitting regular SQL commands 406.

The system 400 does not import data into the DBMS 106, but accesses the data it needs from an ECF storage provider during execution of MapReduce (MR) tasks 404. With increases in networking speeds, due to the advancement of technologies, such as full bi-sectional topologies, co-location of data with node hosting the DBMS becomes less important.

One embodiment of the system 400 is built from the v1.0 branch of Hadoop ported to Windows® by Hortonworks, Inc. The system was developed with SQL Server for the DBMS, and the Hadoop environment, using public supported APIs. This approach, referred to herein as SQL-MR, gives an MR task 404 access to the full power of the SQL Server query processor. As stated previously, the query processor can process external ECF data efficiently. Further, the query processor automatically parallelizes the computation to make use of all processor cores of the compute node hosting the DBMS engine. Due to the powerful query capabilities of the DBMS engine, it is simpler for the tasks 404 to perform very complex processing (such as multi-way joins) than would be the case for a traditional MR task. As such, each task 404 can do more work, meaning that fewer tasks and processing stages are used in the MapReduce workflows, which helps reduce the elapsed time of a job.

The implementation consists of two stored SQL procedures called MapSproc and ReduceSproc, and two custom MapReduce Java classes, MapSql and ReduceSql. The MapSproc stored procedure is invoked with a list of file names (containing row groups) and a user defined query. On invocation, the DBMS 410: 1) creates one or more new (temporary) database tables; 2) attaches the row groups contained in the files to the respective tables; 3) runs a user-defined SQL query; 4) writes the query result as intermediate output to the local file system 412; and, 5) return the output filename to the caller and finally 6) removes the temporary database table. In one embodiment, the intermediate data is in CSV format because converting data to ECF can be computationally expensive. In another embodiment, the intermediate data is written in the ECF.

The ReduceSproc takes a list of file names (containing paths of the intermediate data file produced by the previous step) and a SQL Query. The execution of the ReduceSproc is similar to that of MapSprocs. The MR classes MapSql and ReduceSql communicate with and control the corresponding stored procedures. In example embodiment, the methods of these classes open a JDBC connection to the local SQL server instance in order to compute with said stored procedures. Therefore, the JDBC connection is the communication path by which the MapReduce classes pass information back and forth to the DBMS 410. The JDBC connection is used as a control interface to SQL Server. No input or output row data flows across this channel.

The performance of the system 400 is dependent on the number of row groups available to a given Mapper task. A subclass of the CombineFileInputFormat MapReduce class was implemented that controls the size of a file-split by grouping multiple row groups together. The grouping factor is a command-line option set during job submission. The system 400 uses a grouping factor that divides the input set into N equal sized units, where N is the number of compute nodes in the cluster. Multiple mappers per node are not used because SQL Server parallelizes the execution over all cores of a compute node 402.

The block placement algorithm in Hadoop Map tasks uses location (server, rack) affinities to optimize for data-locality. A large grouping size creates file-splits consisting of a mixture of local and remote blocks. For local blocks, the Datanode protocol is circumvented by setting the ACLS of the appropriate directories, thereby giving read permissions to local service processes. Remote blocks are accessed through the WebHDFS interface using a high performance HTTP agent.

A reducer expects its input data to be correctly partitioned and sorted, prior to being processed. To this end, a map task partitions its output data, and outputs each partition to a separate file. The MapSproc creates a single unsorted partition as input to the Reducer. In one embodiment, the MapSproc is modified to output sorted partitioned streams.

In an experiment, the Apache Hive [vldb09-938.pdf] 0.9 data warehouse system was used as the baseline. Hive implements a declarative SQL-like language, called HiveQL that supports selection, projection, aggregation and joins. It does not provide support for updating or deleting of rows.

The TPC-H Query 1 was used for the evaluation, as it may represent a typical class of aggregation queries without join operators. The query touches over 98% of the rows and uses more than half of the columns. HiveQL is similar enough to SQL that the query may be run on Hive with minimal change.

In the example embodiment, the query was split into two sub-queries, the first sub-query being used by map tasks, and the second sub-query is used by the reduce task and performs the final aggregation. it applies the selection predicate to its input and performs a local aggregation. For the experiments, one map task was run on each node, and one reduce task was run for the whole cluster 100.

One compute node 102 in the cluster was used to run the HDFS NameNode service, and a second node 102 to run the MapReduce JobTracker service. No other Hadoop services run on these dedicated nodes 102. Isolating these machines from the machines running the MapReduce TaskTracker, and the HDFS DataNode services eliminates conflicts for hardware resources, thereby reducing the probability that the NameNode or JobTracker are prevented from making progress. All other compute nodes 102 in a given configuration run the DataNode, TaskTracker, and SQL Server services concurrently.

The nodes 102 used in the experiments have the same hardware specifications. To give Hive the same competitive hardware advantage as SQL Server using multiple cores, the Hadoop configuration was modified for the Hive experiments to run six concurrent mappers or reducers. To prevent caching within SQL Server from impacting measurements, the SQL service was restarted between every run. Each measurement in the experiment is an average over a series of three runs. The experiment was run for a cluster of 8 nodes 102, and a cluster of 15 nodes 102.

Figure 5:
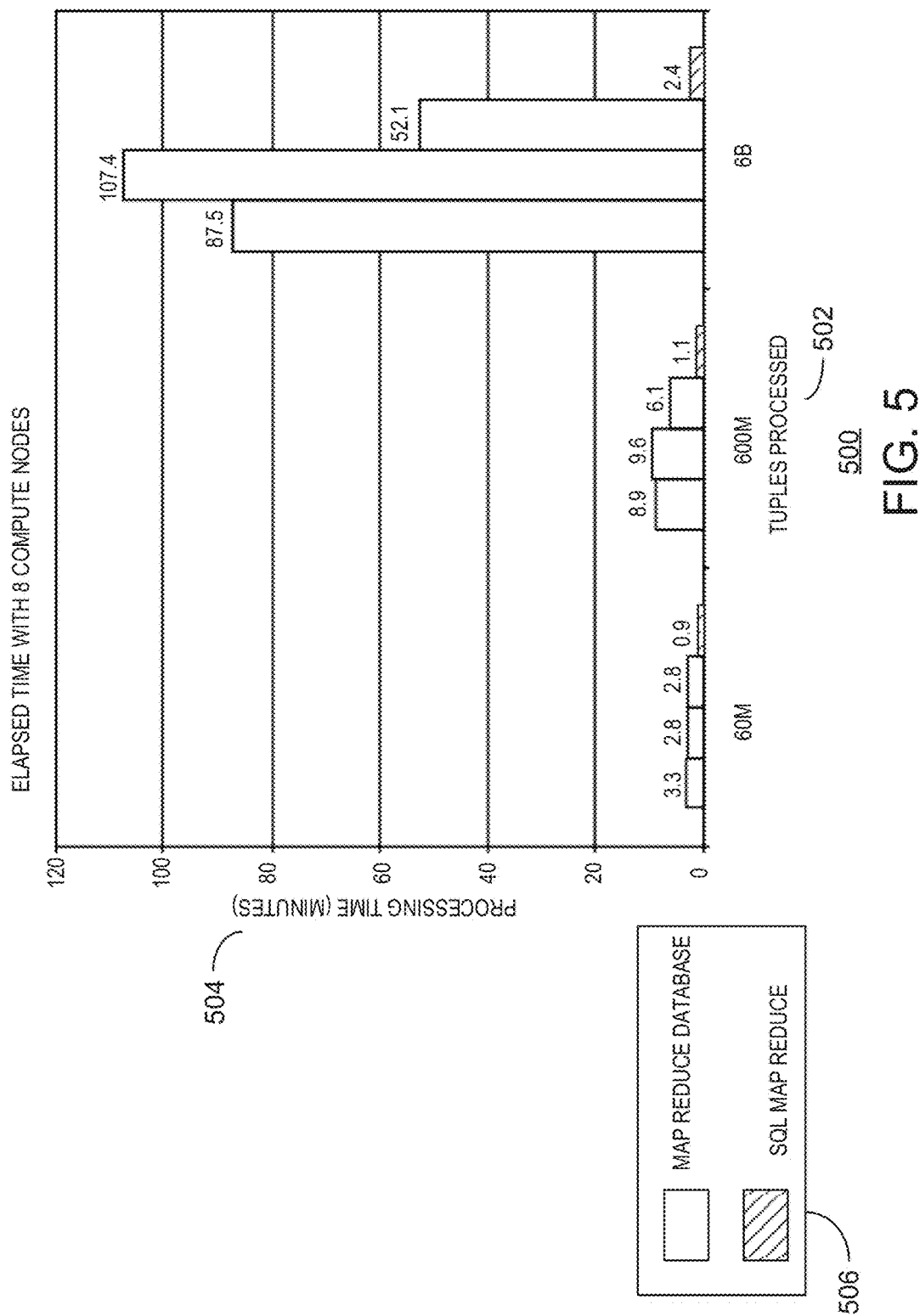
FIG. 5 is a graph showing an experimental result of the MapReduce SQL system compared with an example MapReduce implementation, in accordance with the claimed subject matter.

FIG. 5 is a graph 500 showing experimental results of an example MapReduce SQL system, in accordance with the claimed subject matter. The graph 500 includes an X-axis 502 for "Tuples Processed," and a Y-axis 504 for "Processing Time." The legend 506 distinguishes the bars on the graph 500 representing traditional MapReduce datasets, and the SQL MapReduce dataset, e.g., ECF datasets 108. The experiment was run using three different input formats for Hive: text files, Sequence files, and RCFile. The results for each file are shown as bars for the MapReduce datasets, respectively, from left to right.

Figure 6:
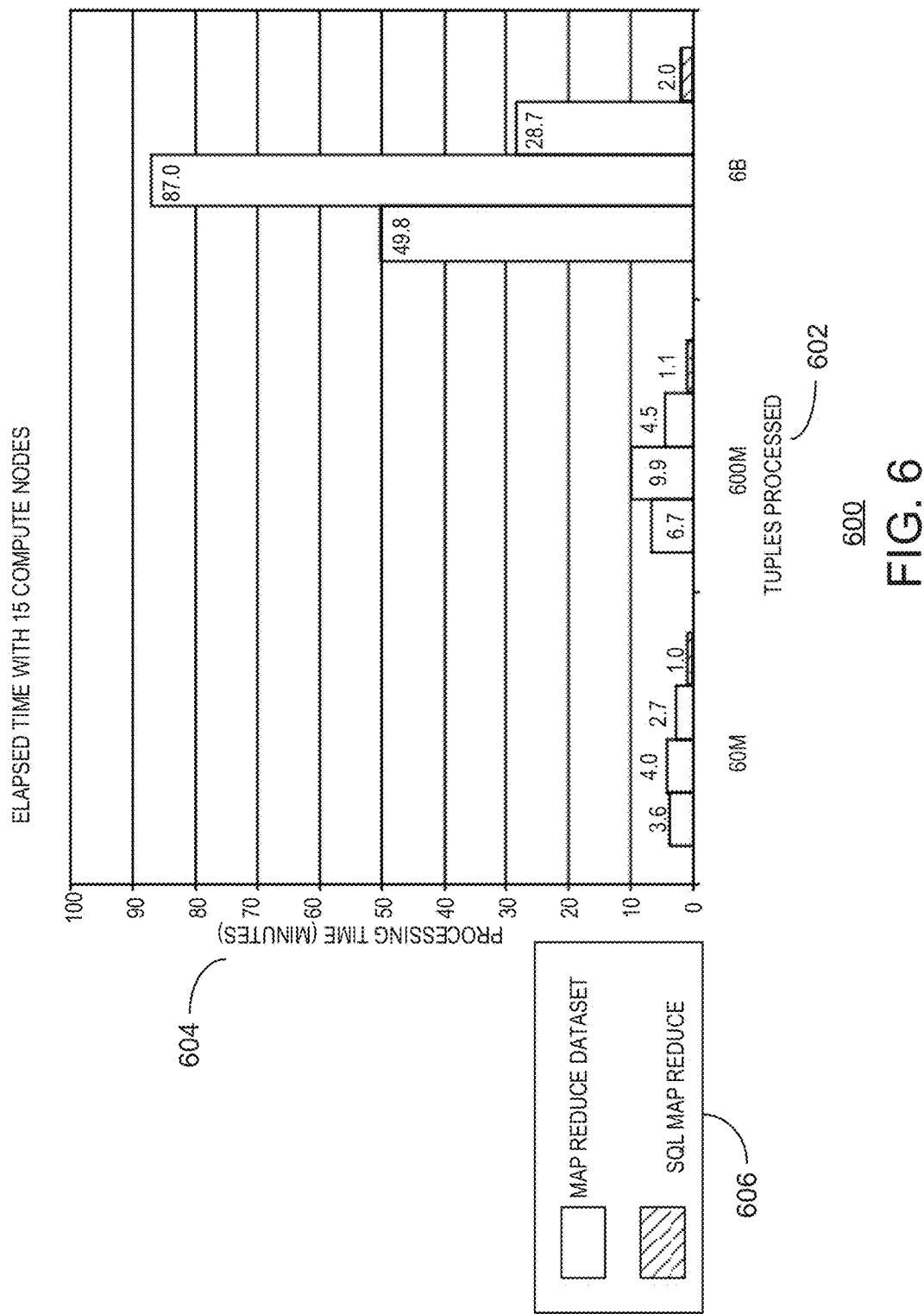
FIG. 6 is a graph showing an experimental result of the MapReduce SQL system compared with an example MapReduce implementation, in accordance with the claimed subject matter.

FIG. 6 is a graph 600 showing experimental results of an example MapReduce SQL system, in accordance with the claimed subject matter. The graph 600 includes an X-axis 602 for "Tuples Processed," and a Y-axis 604 for "Processing Time." The legend 606 distinguishes the bars on the graph 600 representing traditional MapReduce datasets, and the SQL MapReduce dataset, e.g., ECF datasets 108. The experiment was run using three different input formats for Hive: text files, Sequence files, and RCFile. The results for each file are shown as bars for the MapReduce datasets, respectively, from left to right.

Processing for the RCFile outperformed the other two MapReduce datasets in all experiments by a wide margin. However, SQL MapReduce provides an even greater performance increase over RCFile. In FIG. 5, the speedup ranges from 5.5× for 600 million tuples, to 21.7× for 6 billion tuples. When the number of compute nodes is increased to 15, the speedups drop slightly to 4.1× for 600 million tuples, and 14.3× for 6 billion tuples. For more selective queries, the speedup margins would be larger.

As shown, SQL MapReduce scales better than Hive over RCFile as data size increases. One reason for this is the number of MapReduce tasks used by Hive over the RCFile, and how the number of tasks increases with job size. More tasks add overhead for task scheduling and initialization which adds to job latency. In contrast, for SQL MapReduce, the number of tasks is proportional to the number of compute nodes 102. In Hive, the number of tasks is proportional to the data size.

The compute efficiency of ECF datasets 108 over RCFile can be determined by looking at the map portion of queries only. For SQL MapReduce, practically all work of a query was done in the first map layer, producing very few rows of intermediate data. For RCFile, there was significant additional work done in the reduce layer, which is not included in this estimate. A lower bound between 6× and 20×, or better is shown in Table 3. Table 3 represents the time to compute a 12.5% slice of the data for both the 60 million, and 600 million tuple datasets, assuming single threaded execution. The raw computing of a map task from the overhead of scheduling and initialization is not included in Table 3. As such, Table 3 shows the time from start to finish for the map invocation.

TABLE 3

Compute Time for Single Threaded Execution (secs)

| | SQL-MR | Hive RCFile |
|---|---|---|
| 75 million rows (100×) | 95 | 676 |
| 750 million rows (1000×) | 385 | 7705 |

A distinguishing feature of ECF is that it supports direct access by a DBMS 106 in vectored execution mode, i.e., batch mode. With a ECF datasets 108 accessed as described above, the DBMS 106 is able to cache data directly in its large object cache as well, further improving remote table access performance. A Java InputFormat subclass (directly consuming ECF) may be developed to allow access from Hadoop and Hive, demonstrate the ability of ECF as general-purpose format that can be accessed by a DBMS 106 and Big Data systems.

Converting the data from a row-oriented representation (such as CSV format) into columnar format consists of the following three steps: encoding column values, determining optimal row ordering, and compressing each column.

The encoding step transforms column values into a uniform type, e.g., a 32-bit or 64-bit integer. The encoding may be a dictionary based encoding, or a value based encoding. The dictionary based encoding transforms a set of distinct values into a set of sequential integer numbers (data ids). The actual values are stored in a data dictionary, which is an array that is indexed by data ids.

The value based encoding applies to integer and decimal data types. Value based encoding transforms the domain, i.e., the minimum and maximum range, of the set of values occurring in a column segment into a smaller domain of integer numbers. The transformation uses the formula $Y=fX-b$ where X is the original value and Y is the transformed value. The scale factor, f, is a power of 10. The base offset, b, is chosen so that the transformed values are positive. The value, b, is the minimum over all the values fX computed from the values in the column segment.

For decimal data types, the scale factor is set to the smallest power of 10 that converts every value in the column segment into an integer number. For example, for values 0.5, 10.77, and 1.333, the scale factor is $10^3=1000$ producing the integers 500, 10770, and 1333. The base offset equals 500=min(500, 10770, 1333), so the final transformed values are 0, 10270, and 833. The transformation applied to the column segment is specified by storing the exponent of the scale factor (3) and the base offset (500) in the metadata for the segment.

For integer data types the scale factor f is a negative power of 10. The purpose of the multiplication by f is to eliminate as many trailing zeros as possible. Suppose we have the values 500, 1700, and 1333000. The minimum number of trailing zeros is 2 so the scale factor is set to $10^{-2}=1/100$. After multiplying the original values by f we have 5, 17, and 13330. The smallest value is 5 so the base offset is 5. Applying the transformation with a base offset of 5 yields the transformed values 0, 12, 13325. The metadata for the segment contains −2 as the scale factor exponent and 5 as the base offset.

Performance benefits accrue from operating directly on data compressed using run-length encoding (RLE). RLE's is more effective at compression when many identical values are clustered together in a column segment. In ECF, rows within a row group are not sorted in any particular order. As such, rows can freely be rearranged to improve the overall compression. For a schema containing only a single column, clustering is improved by sorting the column, as this clusters identical values together. For schemas with two or more columns, rearranging rows based on one column can negatively affect clustering of identical values in other columns SQL Server internally uses an algorithm called Vertipaq to rearrange rows within a row group in an order that achieves maximal RLE compression.

After the rows within a row group have been rearranged, each column segment is compressed independently using RLE compression or bit packing. RLE compression stores data as a sequence of <value, count> pairs. The actual value is a 32-bit or 64-bit number containing either an encoded value or the original value.

RLE compression prefers long runs of identical values. If a column contains too few long runs, RLE compression may increase the space used, i.e., unique column values. Since values in a column segment get encoded into a smaller domain of integer numbers (data ids), the actual range of encoded values may use fewer bits to represent than the actual values. For cases where RLE increases space, a bit-pack compression scheme and different bit-pack compression sizes may be used.

In one example of the claimed subject matter, the ECF datasets 108 are stored as both file folders and single-file packages. In the file folder approach, a single folder represents a row group, and contains a binary file for each column segment, each dictionary, and a Javascript Object Notation (JSON) file for the metadata. In the single-file package approach, these same objects are included in one file, with the metadata and a directory at the front. Contrary to ECF data stored internally in the DBMS, in either packaging approach, only the secondary dictionary is utilized. There is no shared primary dictionary across row-groups. This allows the ECF datasets 108 to be self-contained for easier management and data movement. This comes at a small expense in lost compression.

How each column in a row group is encoded, and where the column is stored, is used by the system 100 to process the ECF datasets 108. Each row group has an associated metadata file that contains information about the column segments and dictionaries of the row group. The metadata may be stored in JSON format.

The metadata for a column consists of: object type (column segment), column name and data type, encoding type and encoding-specific parameters including dictionary IDs for dictionary encoded columns, min and max (encoded) values, whether null values are present and the value used for null, segment size and row count, ECF version, and the name of file where column segment is stored. The metadata for a dictionary contains: object type (dictionary), column name, dictionary ID, dictionary type and type-specific parameters, highest ID in the dictionary, size and number of entries, ECF version, and the name of the file where the dictionary is stored. In embodiments of the claimed subject matter, further information may be added to the metadata file, for example, a histogram or other information useful for query optimization, or fast segment elimination during query processing.

The data for an ECF row group is comprised of metadata, column segments, and data dictionaries. The packaging of these components into files affects performance when querying or importing the data from external storage. Two packing approaches were used in an example implementation, and evaluated on top of NTFS local files, SMB shared files, and HDFS. The first approach spreads a row group over a directory sub-tree, making it easier to visualize and reason about. In the second approach, the row groups are self-contained and stored in a single file.

When spreading a row group over a directory sub-tree, each row group is stored in a file directory where the various components are each stored in separate files. This packaging approach allows visual inspection of the components of a row group and a simple implementation of the read mechanism. However, this represents the row group as multiple distinct files, which leads to file system-specific disadvantages. For example, for SMB shares, one disadvantage is the fact that file open operations on Windows (Win32 API CreateFile method) are synchronous. Opening many small files, even for read-ahead, leads to convoying of open file operations, or to a large number of threads blocking on open file operations.

For HDFS, this packaging option increases memory pressure on the metadata provider since file-metadata is memory resident. This can lead to performance bottlenecks on the name node service.

In the second approach, the components of a row group are packed into a single file. The file starts with a directory block listing all contained parts (group metadata, segments and dictionaries) along with their lengths and offsets within the file. For all file systems, fewer large files, instead of many small files, reduces metadata overhead for the underlying file system (e.g. directory storage).

Advantageously, with SMB file shares, one open file operation is performed for all segments and dictionaries of a row group. The read-ahead manager 114 keeps the file handle open until the row group has been processed in its entirety. This reduces convoying of blocking open file operations, and thus ties up fewer threads in blocking calls. Sharing a single file handle for multiple I/O requests is straightforward with the use of overlapped I/O operations, where the file position is specified in each read request.

The single file packing in HDFS uses a single file per row group. HDFS was designed for a small number of large files rather than a large number of small files. The single large file reduces memory requirements on the name node 102, which helps keep more metadata in main memory. In combination with WebHDFS, a single file also allows caching of the http 307 redirect response from the name node for subsequent accesses to other fragments in the same single file package, thus reducing network traffic, and client requests on the name node.

In an example implementation, access to NTFS files and SMB shares is performed using Win32 overlapped file I/O. Access to HDFS storage is performed with a custom high-performance http client layer that uses Winsock2 overlapped socket I/O. Since segment and dictionary sizes are known at request time, HTTP 1.0 is used to prevent chunked transfer encoding. Chunked transfer encoding uses header parsing and block reassembly, and thus prohibits copy-free buffer usage.

The read-ahead manager logic is shared between the different file systems, using a Win32 I/O completion port as the central synchronization mechanism. All blocking system calls and completion notifications are processed by a pool of threads separate from the core pool of SQL threads.

Regardless of the packaging choice, an interesting property of ECF data is that the order in which row groups are processed does not affect the correctness of the query. The read-ahead manager 114 takes advantage of this property by simultaneously issuing read-ahead requests for segments and dictionaries of a large number of row groups. The read-ahead manager 114 also prioritizes row groups during query processing, for which all segment and dictionary read-ahead requests have completed, while trickling further read-ahead requests according to a configurable memory budget. This out-of-order processing reduces I/O waits, especially if the ECF data is striped across many disparate physical locations, such as multiple local disk drives or HDFS blocks.

Figure 7:
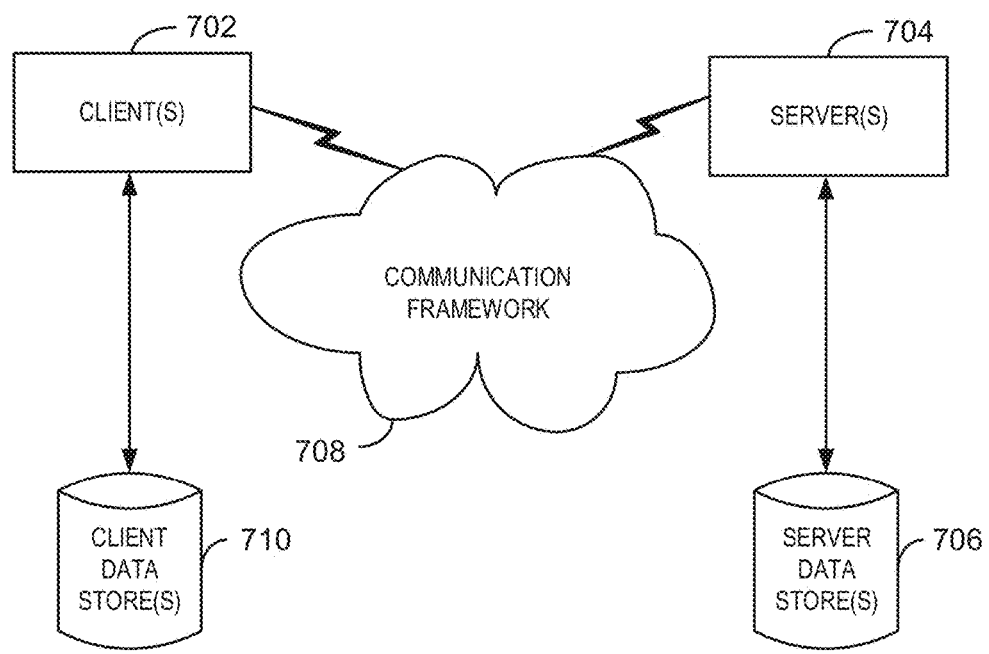
FIG. 7 is a block diagram of an exemplary networking environment wherein aspects of the claimed subject matter can be employed.

FIG. 7 is a block diagram of an exemplary networking environment 700 wherein aspects of the claimed subject matter can be employed. Moreover, the exemplary networking environment 700 may be used to implement a system and method that process external datasets with a DBMS engine.

The networking environment 700 includes one or more client(s) 702. The client(s) 702 can be hardware and/or software (e.g., threads, processes, computing devices). As an example, the client(s) 702 may be client devices, providing access to server 704, over a communication framework 708, such as the Internet.

The environment 700 also includes one or more server(s) 704. The server(s) 704 can be hardware and/or software (e.g., threads, processes, computing devices). The server(s) 704 may include a server device. The server(s) 704 may be accessed by the client(s) 702.

One possible communication between a client 702 and a server 704 can be in the form of a data packet adapted to be transmitted between two or more computer processes. The environment 700 includes a communication framework 708 that can be employed to facilitate communications between the client(s) 702 and the server(s) 704.

The client(s) 702 are operably connected to one or more client data store(s) 710 that can be employed to store information local to the client(s) 702. The client data store(s) 710 may be located in the client(s) 702, or remotely, such as in a cloud server. Similarly, the server(s) 704 are operably connected to one or more server data store(s) 706 that can be employed to store information local to the servers 704.

Figure 8:
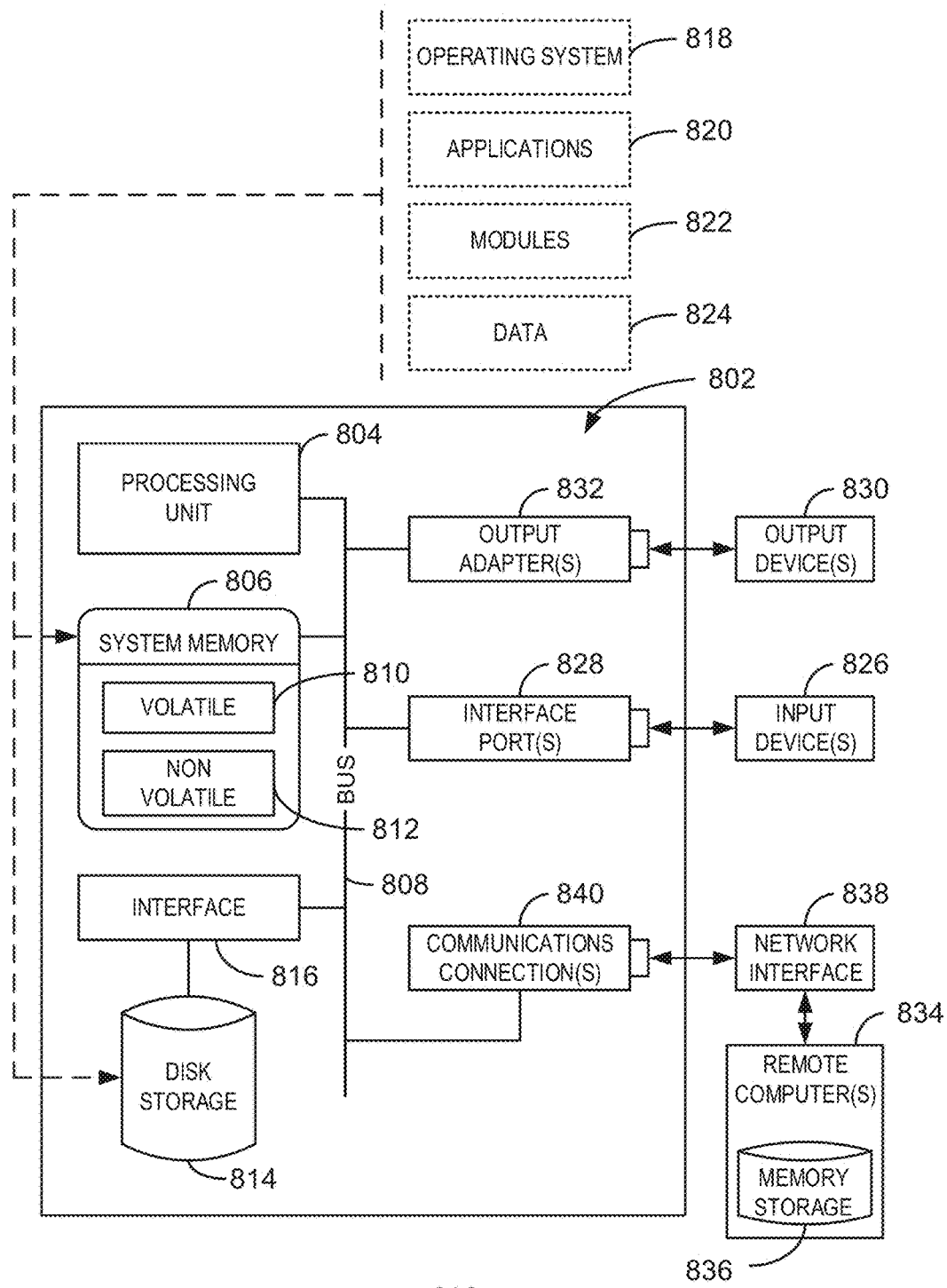
FIG. 8 is a block diagram of an exemplary operating environment for implementing various aspects of the claimed subject matter.

FIG. 8 is a block diagram of an exemplary operating environment for implementing various aspects of the claimed subject matter. The exemplary operating environment 800 includes a computer 802. The computer 802 includes a processing unit 804, a system memory 806, and a system bus 808.

The system bus 808 couples system components including, but not limited to, the system memory 806 to the processing unit 804. The processing unit 804 can be any of various available processors. Dual microprocessors and other multiprocessor architectures also can be employed as the processing unit 804.

The system bus 808 can be any of several types of bus structure(s) including the memory bus or memory controller, a peripheral bus or external bus, and/or a local bus using any variety of available bus architectures known to those of ordinary skill in the art. The system memory 806 includes computer-readable storage media that includes volatile memory 810 and nonvolatile memory 812.

The basic input/output system (BIOS), containing the basic routines to transfer information between elements within the computer 802, such as during start-up, is stored in nonvolatile memory 812. By way of illustration, and not limitation, nonvolatile memory 812 can include read only memory (ROM), programmable ROM (PROM), electrically programmable ROM (EPROM), electrically erasable programmable ROM (EEPROM), or flash memory.

Volatile memory 810 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), SynchLink™ DRAM (SLDRAM), Rambus® direct RAM (RDRAM), direct Rambus® dynamic RAM (DRDRAM), and Rambus® dynamic RAM (RDRAM).

The computer 802 also includes other computer-readable media, such as removable/non-removable, volatile/nonvolatile computer storage media. FIG. 8 shows, for example a disk storage 814. Disk storage 814 includes, but is not limited to, devices like a magnetic disk drive, floppy disk drive, tape drive, Jaz drive, Zip drive, LS-100 drive, flash memory card, or memory stick.

In addition, disk storage 814 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 814 to the system bus 808, a removable or non-removable interface is typically used such as interface 816.

It is to be appreciated that FIG. 8 describes software that acts as an intermediary between users and the basic computer resources described in the suitable operating environment 800. Such software includes an operating system 818. Operating system 818, which can be stored on disk storage 814, acts to control and allocate resources of the computer system 802.

System applications 820 take advantage of the management of resources by operating system 818 through program modules 822 and program data 824 stored either in system memory 806 or on disk storage 814. It is to be appreciated that the claimed subject matter can be implemented with various operating systems or combinations of operating systems.

A user enters commands or information into the computer 802 through input device(s) 826. Input devices 826 include, but are not limited to, a pointing device (such as a mouse, trackball, stylus, or the like), a keyboard, a microphone, a joystick, a satellite dish, a scanner, a TV tuner card, a digital camera, a digital video camera, a web camera, and the like. The input devices 826 connect to the processing unit 804 through the system bus 808 via interface port(s) 828. Interface port(s) 828 include, for example, a serial port, a parallel port, a game port, and a universal serial bus (USB).

Output device(s) 830 use some of the same type of ports as input device(s) 826. Thus, for example, a USB port may be used to provide input to the computer 802, and to output information from computer 802 to an output device 830.

Output adapter 832 is provided to illustrate that there are some output devices 830 like monitors, speakers, and printers, among other output devices 830, which are accessible via adapters. The output adapters 832 include, by way of illustration and not limitation, video and sound cards that provide a means of connection between the output device 830 and the system bus 808. It can be noted that other devices and systems of devices provide both input and output capabilities such as remote computer(s) 834.

The computer 802 can be a server hosting various software applications in a networked environment using logical connections to one or more remote computers, such as remote computer(s) 834. The remote computer(s) 834 may be client systems configured with web browsers, PC applications, mobile phone applications, and the like.

The remote computer(s) 834 can be a personal computer, a server, a router, a network PC, a workstation, a microprocessor based appliance, a mobile phone, a peer device or other common network node and the like, and typically includes many or all of the elements described relative to the computer 802.

For purposes of brevity, only a memory storage device 836 is illustrated with remote computer(s) 834. Remote computer(s) 834 is logically connected to the computer 802 through a network interface 838 and then connected via a wireless communication connection 840.

Network interface 838 encompasses wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 840 refers to the hardware/ software employed to connect the network interface 838 to the bus 808. While communication connection 840 is shown for illustrative clarity inside computer 802, it can also be external to the computer 802. The hardware/software for connection to the network interface 838 may include, for exemplary purposes only, internal and external technologies such as, mobile phone switches, modems including regular telephone grade modems, cable modems and DSL modems, ISDN adapters, and Ethernet cards.

An exemplary processing unit 804 for the server may be a computing cluster comprising Intel® Xeon CPUs. The disk storage 814 may comprise an enterprise data storage system, for example, holding thousands of impressions.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage media having computer-executable instructions for performing the acts and/or events of the various methods of the claimed subject matter.

There are multiple ways of implementing the subject innovation, e.g., an appropriate API, tool kit, driver code, operating system, control, standalone or downloadable software object, etc., which enables applications and services to use the techniques described herein. The claimed subject matter contemplates the use from the standpoint of an API (or other software object), as well as from a software or hardware object that operates according to the techniques set forth herein. Thus, various implementations of the subject innovation described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical).

Additionally, it can be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A method for processing a dataset with a database management system (DBMS) engine, the method comprising:
    splitting bulk data into a plurality of chunks;
    converting the chunks to an external dataset comprising a plurality of row groups, the external dataset being external to a DBMS comprising the DBMS engine, the external dataset comprising a DBMS-specific columnar format;
    generating a dictionary that is not shared across row-groups to package the chunks into the plurality of row groups;
    creating an empty DBMS table within the DBMS;
    attaching a row group in the external dataset to the empty DBMS table, wherein attaching the row group comprises reading metadata for the row group in the external dataset and copying the metadata for the row group into the empty DBMS table, and wherein the metadata comprises a dictionary identifier;
    executing a MapReduce job on a cluster of compute nodes using the dataset external to the DBMS as input; and
    querying, via the DBMS engine, the external dataset without importing data in the external dataset into the DBMS.

2. The method recited in claim 1, the compute nodes each comprising an instance of the DBMS.

3. The method recited in claim 2, wherein converting the chunks is performed in parallel on the compute nodes, each of the compute nodes converting one of the chunks.

4. The method recited in claim 2, comprising:
    sending, via the MapReduce job, commands to the DBMS; and
    processing, via the DBMS, the external dataset in response to the commands.

5. The method recited in claim 2, wherein each of the chunks comprise a number of rows approximate to a number of rows of the bulk data divided by the number of compute nodes.

6. The method recited in claim 2, wherein the MapReduce job comprises a map job executing on each of the compute nodes.

7. A method for loading data to a DBMS, comprising:
    splitting bulk data into a plurality of chunks;
    converting the chunks to an external dataset comprising a plurality of row groups, the external dataset being external to a DBMS comprising the DBMS engine, the external dataset comprising a DBMS-specific columnar format;
    generating a dictionary that is not shared across row-groups to package the chunks into the plurality of row groups;
    attaching the row groups in the external dataset to the empty DBMS table, wherein attaching the row groups comprises reading a metadata for the row groups in the external dataset and copying the metadata for the row groups into the empty DBMS table, and wherein the metadata comprises a dictionary identifier;

performing a binary copy of the row groups to an instance of the DBMS executing on each compute node of a cluster, the row groups being a dataset external to a DBMS comprising the DBMS engine; and querying, via the DBMS engine, the external dataset without importing data in the external dataset into the DBMS.

8. The method of claim 7, wherein converting the chunks is performed in parallel on the compute nodes, each of the compute nodes converting one of the chunks.

9. The method recited in claim 7, comprising:
sending, via the MapReduce job, commands to the DBMS; and
processing, via the DBMS, the previously attached ECF data.

10. The method recited in claim 7, wherein each of the chunks comprise a number of rows approximate to a number of rows of the bulk data divided by the number of compute nodes.

11. The method recited in claim 7, wherein a number of chunks approximates a number of compute nodes.

12. A system for executing a MapReduce job, comprising:
a cluster of compute nodes, each comprising:
a processing unit; and
a system memory, wherein the system memory comprises code configured to direct the processing unit to:
split bulk data into a plurality of chunks;
convert the chunks to an external dataset comprising a plurality of row groups, the external dataset being external to a DBMS comprising the DBMS engine, the external dataset comprising a DBMS-specific columnar format, wherein a dictionary that is not shared across row-groups is to be generated to package the chunks into the plurality of row groups;
create an empty DBMS table within the DBMS;
attach the row groups in the dataset external to the DBMS to the empty DBMS table, wherein attaching the row groups comprises reading a metadata for the row groups in the external dataset and copying the metadata for the row groups into the empty DBMS table, and wherein the metadata comprises a dictionary identifier;
execute a MapReduce job on a cluster of compute nodes, using the dataset external to the DBMS as input; and
query the external dataset without importing data in the external dataset into the DBMS.

13. The system recited in claim 12, the compute nodes each comprising an instance of the DBMS.

14. The system recited in claim 12, wherein converting the chunks is to be performed in parallel on the compute nodes, each of the compute nodes to convert one of the chunks.

15. The system recited in claim 12, wherein a number of chunks is to be equal to a number of compute nodes.

16. The system recited in claim 12, wherein each of the chunks is to comprise a number of rows approximate to a number of rows of the bulk data divided by the number of compute nodes.

17. The system recited in claim 12, wherein the MapReduce job comprises a map job to be executed on each of the compute nodes.

18. The system recited in claim 12, wherein the row groups in the dataset are to be attached by copying metadata describing the dataset to a catalog of the DBMS.

19. The system recited in claim 12, the empty DBMS table comprising one or more columns of a same type and number as one or more columns of the dataset external to the DBMS.

20. The system recited in claim 12, wherein the DBMS is to operate in a vectorized query execution mode, and wherein batches of data from multiple tuples are processed as a group.

* * * * *